United States Patent
Mazzei

(10) Patent No.: US 9,151,088 B2
(45) Date of Patent: Oct. 6, 2015

(54) DOOR STRIKER POSITIONER

(75) Inventor: David Mazzei, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 366 days.

(21) Appl. No.: 13/593,943

(22) Filed: Aug. 24, 2012

(65) Prior Publication Data

US 2014/0053388 A1 Feb. 27, 2014

(51) Int. Cl.
*B23P 19/04* (2006.01)
*E05B 85/04* (2014.01)
*E05B 15/02* (2006.01)
*B23Q 3/18* (2006.01)
*E05B 65/00* (2006.01)
*E05B 83/36* (2014.01)
*E05B 83/00* (2014.01)
*B25B 27/00* (2006.01)

(52) U.S. Cl.
CPC .............. *E05B 85/045* (2013.01); *B23Q 3/186* (2013.01); *E05B 15/024* (2013.01); *B23P 19/04* (2013.01); *B25B 27/00* (2013.01); *E05B 15/022* (2013.01); *E05B 65/00* (2013.01); *E05B 83/00* (2013.01); *E05B 83/36* (2013.01); *E05B 85/04* (2013.01); *Y10T 29/4978* (2015.01); *Y10T 29/4984* (2015.01); *Y10T 29/49778* (2015.01); *Y10T 29/49895* (2015.01); *Y10T 29/49902* (2015.01); *Y10T 29/49963* (2015.01); *Y10T 29/53978* (2015.01); *Y10T 29/53983* (2015.01)

(58) Field of Classification Search
CPC ..... E05B 85/04; E05B 85/045; E05B 15/024; E05B 83/36; E05B 83/00; E05B 65/00; E05B 15/022; B23Q 3/186; Y10T 29/53983; Y10T 29/49963; Y10T 29/49902; Y10T 29/4978; Y10T 29/49778; Y10T 29/4984; Y10T 29/49895; Y10T 29/53978; B23P 19/04; B25B 27/00

USPC ........ 29/464, 407.1, 407.09, 468, 434, 281.5, 29/525.11, 281.6; 292/341.18, 341.19, 292/DIG. 51, DIG. 73; 81/484
See application file for complete search history.

(56) References Cited

U.S. PATENT DOCUMENTS

| | | | |
|---|---|---|---|
| 1,460,133 A * | 6/1923 | Hurd | 292/173 |
| 4,744,135 A * | 5/1988 | Roels | 29/267 |
| 5,282,305 A | 2/1994 | Nutt et al. | |
| 5,979,952 A * | 11/1999 | Dering et al. | 292/341.18 |
| 6,029,335 A | 2/2000 | Hui et al. | |
| 6,092,271 A | 7/2000 | Stojkovic et al. | |
| 6,279,218 B1 | 8/2001 | Lezuch et al. | |
| 6,324,948 B1 * | 12/2001 | Kavc et al. | 81/484 |
| 2011/0210568 A1 * | 9/2011 | Williams | 292/341.15 |
| 2012/0112477 A1 * | 5/2012 | Muramatsu et al. | 292/340 |

* cited by examiner

*Primary Examiner* — Sarang Afzali
*Assistant Examiner* — Ruth G Hidalgo-Hernande
(74) *Attorney, Agent, or Firm* — Pearne & Gordon LLP

(57) ABSTRACT

A striker positioning assembly adjusts a striker mechanism on a door frame for latching a door. The striker positioning assembly includes a plate having a slot for receiving a projecting portion of the striker mechanism. The striker positioning assembly includes a fastener for temporarily fastening the plate to the door. The fastener allows for the plate to be removable after adjustment of the striker mechanism. The plate and slot are arranged such that closing the door into a desired position with respect to the door frame causes the striker positioning assembly to move the striker mechanism into a position on the door frame for latching the door in the desired position with respect to the door frame when the striker mechanism is secured on the door frame and when the striker positioning assembly is removed. Methods of adjusting the striker mechanism on the door frame are also provided.

22 Claims, 9 Drawing Sheets

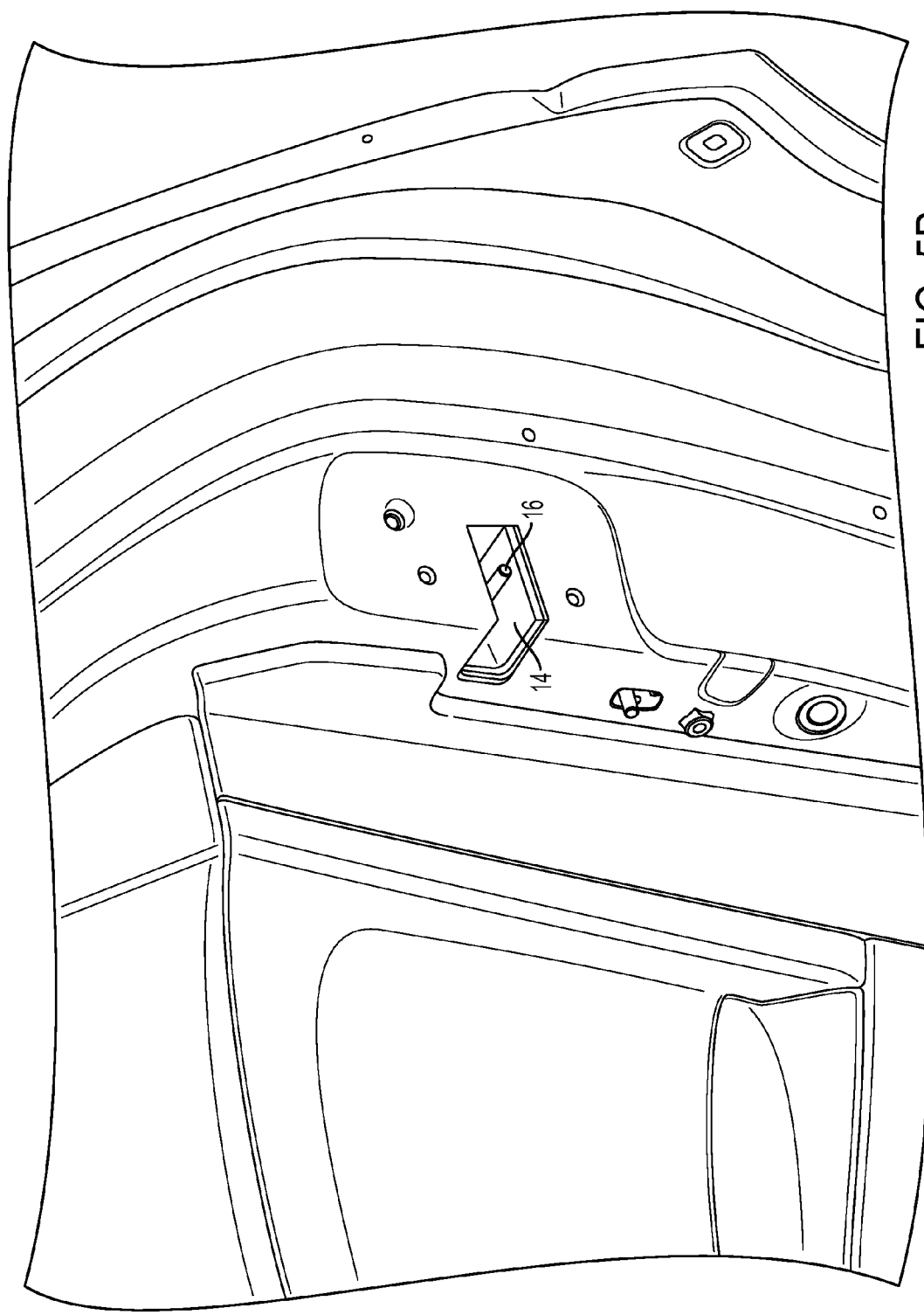

DOOR STRIKER POSITIONER

BACKGROUND

The present disclosure relates generally to the installation of doors for vehicles, and more particularly, to an apparatus and method for aligning a striker assembly with a latch for a door.

Vehicles often include doors having latches. These latches can engage a striker mechanism positioned on a door frame of the vehicle. To retain the door on the door frame in a closed position, the latch can engage and grip the striker mechanism by receiving a portion of the striker mechanism within a slot in the door. To provide for proper gripping and alignment of the door, the striker mechanism should be aligned to be received within the slot in the proper location. However, properly aligning the striker mechanism on the door frame is time consuming, tedious, and inefficient. Current methods for moving and adjusting the striker mechanism on the door frame include using a hammer and/or a crowbar to reposition the striker mechanism. As such, consistently accurate positioning of the striker mechanism can be difficult to achieve, and may damage the mechanisms. Accordingly, it would be beneficial to provide a striker positioning assembly method for properly aligning the striker mechanism with respect to the slot in the door that solves one or more of these problems.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In accordance with one aspect, a striker positioning assembly is provided for adjusting a striker mechanism on a door frame for latching a door. The striker positioning assembly includes a plate having a slot configured to receive a projecting portion of the striker mechanism when the door is closed. The striker positioning assembly further includes at least one fastener configured to temporarily fasten the plate to the door during a process of adjusting the striker mechanism. The fastener allows for the plate to be removable after the striker mechanism has been adjusted. The plate and slot are arranged with the door such that during the process of adjusting, closing the door into a desired position with respect to the door frame causes the striker positioning assembly to move the striker mechanism into a position on the door frame for placing the door in the desired position with respect to the door frame, and after said striker mechanism has been adjusted, the striker mechanism is fully secured on the door frame and the striker positioning assembly is removed from the door.

In accordance with another aspect, a method of adjusting a striker mechanism on a door frame is provided. The method includes the step of attaching a striker mechanism to the door frame such that the striker mechanism is movable relative to the door frame. The method further includes the step of attaching a striker positioning assembly to a door in a removable manner. The method further includes the step of closing the door onto the door frame such that the door is placed in a desired position with respect to the door frame, wherein the striker positioning assembly interacts with the striker mechanism to position the striker mechanism on the door frame in a desired location. The method further includes the step of securing the striker mechanism to the door frame in a fixed manner and removing the striker positioning assembly from the door.

In accordance with another aspect, a method of adjusting a striker mechanism on a door frame is provided. The method includes the step of attaching a striker mechanism to the door frame such that the striker mechanism is movable relative to the door frame. The method further includes the step of attaching a striker positioning assembly to a door in a removable manner such that a slot of the striker positioning assembly is aligned with a door slot such that the slot of the striker positioning mechanism is superimposed on the door slot. The method further includes the step of closing the door onto the door frame such that the door is placed in a desired position with respect to the door frame such that the striker positioning assembly is simultaneously received within the slot of the striker positioning assembly and the door slot. The method also includes the step of securing the striker mechanism to the door frame in a fixed manner.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 5B is a perspective view of the example door and door slot;

DETAILED DESCRIPTION

Figure 1:
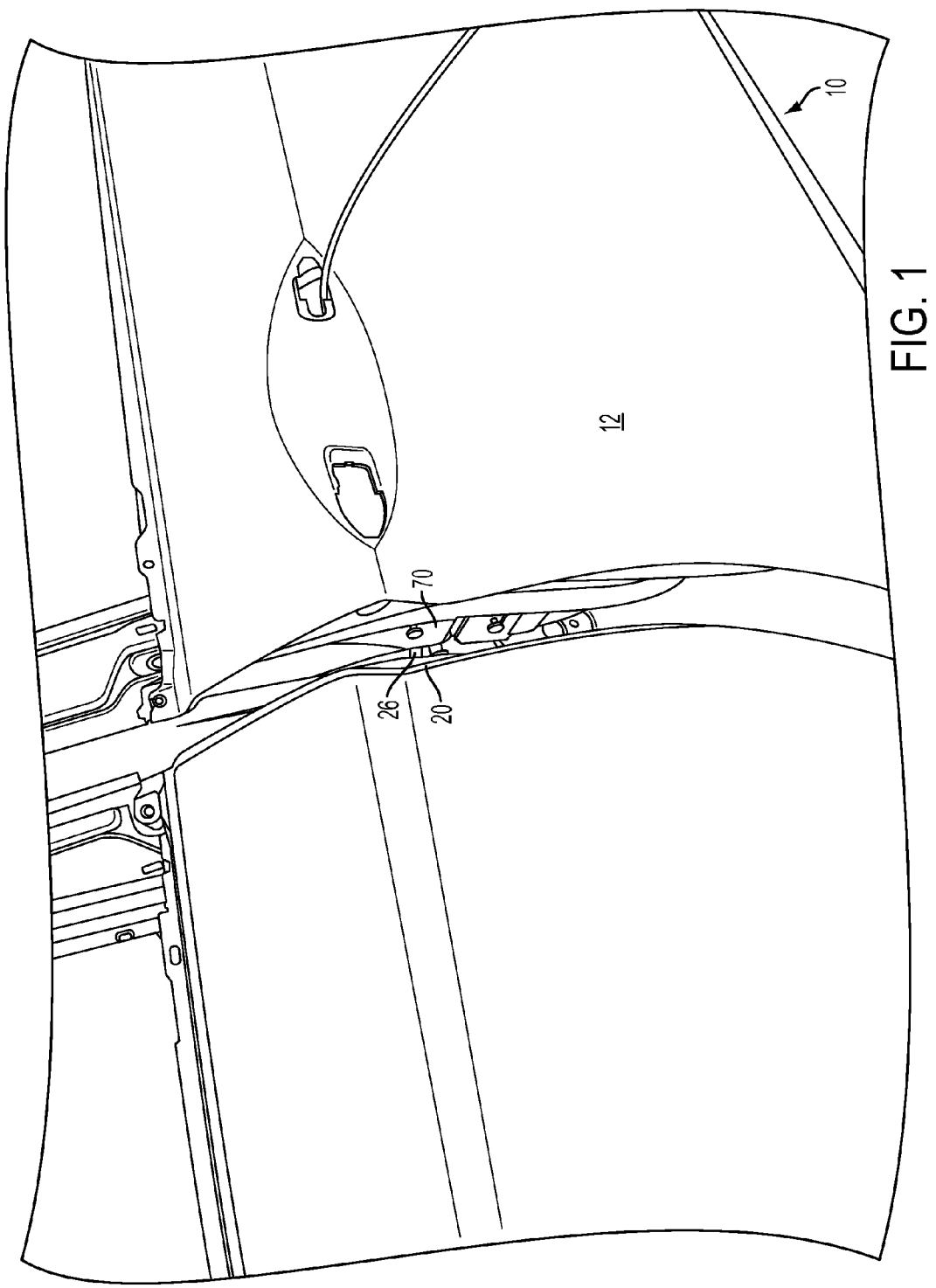
FIG. 1 is a perspective view of an example vehicle having a door with a striker positioning assembly for adjusting a striker mechanism.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation. Still further, in the drawings, the same reference numerals are employed for designating the same elements.

FIG. 1 illustrates a perspective view of an example vehicle 10 undergoing assembly. In short summary, the vehicle 10 has a door 12 movably attached to a door frame 20. During attachment of the door 12 to the door frame 20, the door is adjusted so as to be generally flush with surrounding panels of the vehicle 10. To assist in properly aligning the door 12 with the door frame 20, a striker positioning assembly 70 can be used. The striker positioning assembly 70 is removeably attached to the door 12. The striker positioning assembly 70 can adjust the position of a striker mechanism 26 mounted on the door frame 20. As such, the striker positioning assembly 70 moves the striker mechanism 26 such that the door 12 engages the striker mechanism 26 in a closed state with the door 12 remaining flush with surrounding portions of the vehicle 10.

It is to be appreciated that the vehicle 10 shown in FIG. 1 is somewhat generically depicted. Indeed, the vehicle 10 includes a number of different vehicles that may have doors. For example, the vehicle 10 can include any number of automobiles, such as cars, trucks, buses, etc. The vehicle 10 is not so limited to automobiles, however, and could also include boats, planes, trains, or the like. As such, the striker mechanism 26 and striker positioning assembly 70 can be used in a variety of vehicular applications or other applications.

Referring still to FIG. 1, the door 12 is movably attached with respect to a body of the vehicle 10. For example, the door 12 can be attached by a number of different pivoting structures, such as hinges, or the like (not shown). The door 12 can be movably attached at one end, while the other end (shown in FIG. 1) is free to open and close. The door 12 further includes handles, latches, etc. to allow for ease in opening and closing the door 12.

The door 12 further includes a door slot 14 that is shown more clearly in FIG. 5B and defines an opening bounded at upper and lower edges. The door slot 14 is sized and shaped to receive the striker mechanism 26. In particular, the door slot 14 has a width that is slightly larger in dimension than a width of the striker mechanism 26 such that the striker mechanism 26 can be removably received within the door slot 14. The door slot 14 can further include a latch 16 for gripping the striker mechanism 26. The latch 16 can be manipulated by the handle on the door 12, such that the latch 16 can move between a locked position, in which the latch 16 grips the striker mechanism 26, and an unlocked position, in which the latch 16 does not grip the striker mechanism 26. In the locked position, the door 12 is limited from being opened due to the gripping of the striker mechanism 26 by the latch 16 while in the unlocked position, the door 12 is free to open and close.

Figure 2:
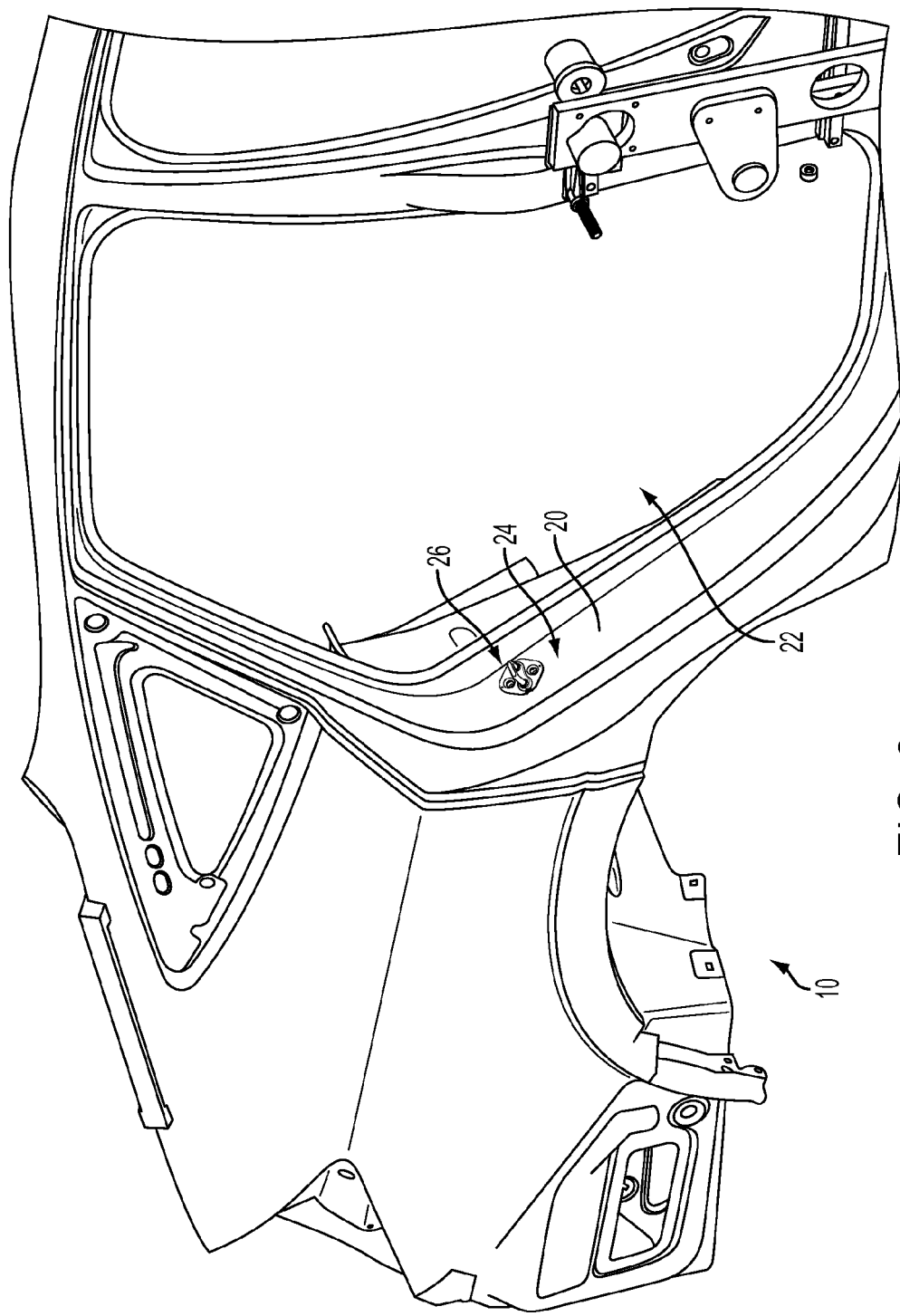
FIG. 2 is a perspective view of the example vehicle having the striker mechanism attached to a door frame.
Figure 3:
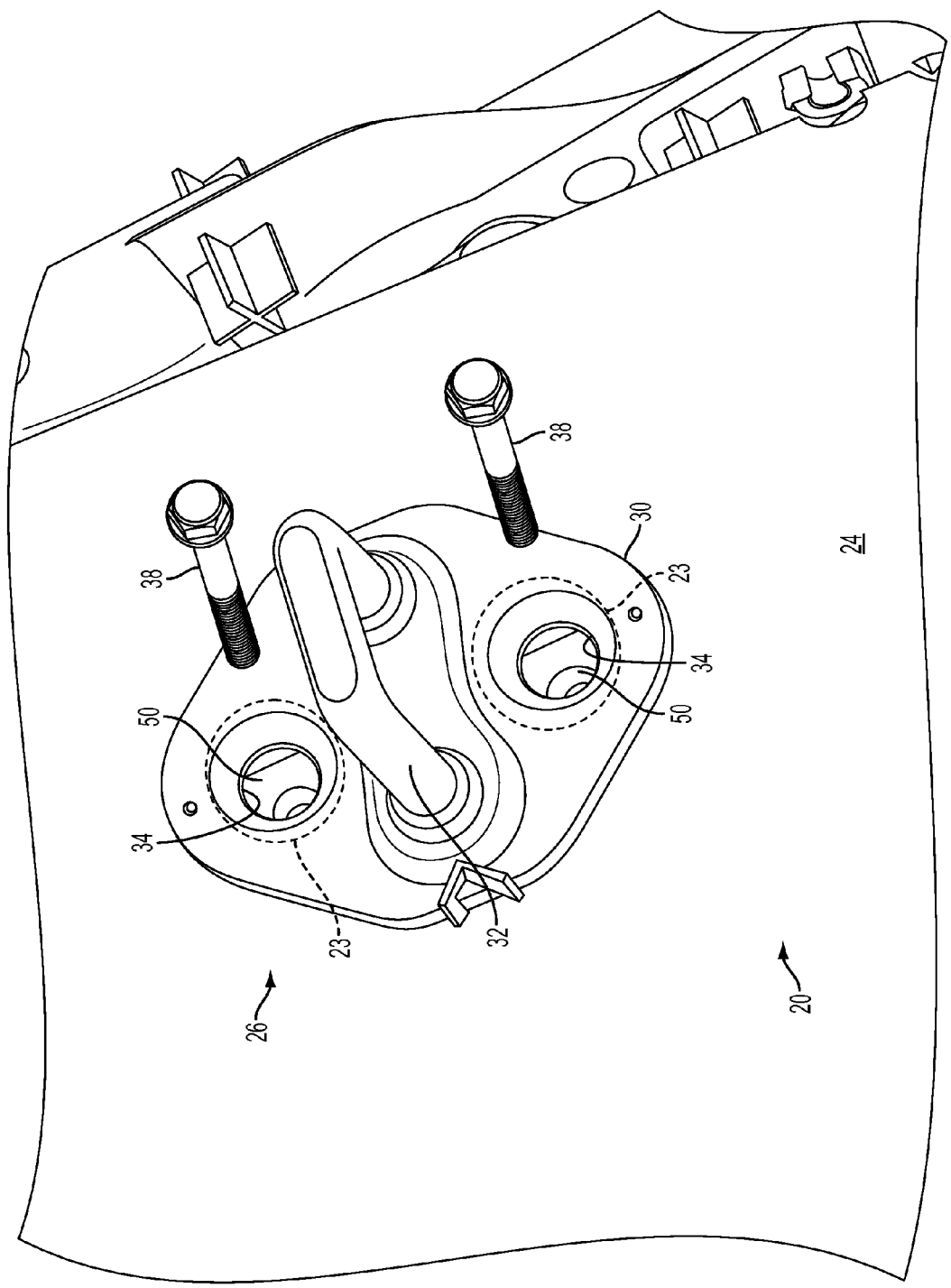
FIG. 3 is a perspective view of the example striker mechanism attached to the door frame.

Turning now to FIGS. 2 and 3, the door frame 20 of the vehicle 10 will now be described in more detail. The door frame 20 can support the door 12 such that the door 12 can move (e.g., open and close) with respect to the door frame 20. The door frame 20 defines an opening 22 to an interior of the vehicle 10. The door frame 20 can support a number of different structures that assist in attaching the door 12 to the door frame 20. The door frame 20 includes one or more door frame attachment openings 23 (shown in FIG. 3) extending through the door frame 20. The door frame attachment openings 23 are sized and shaped to receive fasteners for attaching the striker mechanism 26 to the door frame 20. While two attachment openings are shown in FIG. 3, in further examples, the door frame 20 can instead include a single elongated attachment opening that has a length that is approximately as long as the distance separating the door frame attachment openings 23. The door frame attachment openings 23 are depicted as hatched lines in FIG. 3 as the door frame attachment openings 23 are normally obscured by the striker mechanism 26 and not visible.

Turning now to FIG. 3, the door frame 20 supports the striker mechanism 26. The striker mechanism 26 is attached to the door frame 20 of the vehicle 10 and allows for attachment of the door 12 to the striker mechanism 26. As such, the door 12 can be attached to the door frame 20 in a closed position by engaging the striker mechanism 26.

The striker mechanism 26 includes a striker plate 30. The striker plate 30 defines a generally planar surface extending parallel to a door frame surface 24. As such, the striker plate 30 is flush with the door frame surface 24 when the striker mechanism 26 is attached to the door frame 20. As will be described in more detail below, the striker plate 30 can initially be attached in a manner that is movable with respect to the door frame 20, such that the position of the striker mechanism 26 can be adjusted based on the location of the door 12. However, in operation and following assembly of the door 12, the striker mechanism 26 is attached to the door frame 20 such that the striker mechanism 26 is generally not movable with respect to the door frame 20 but is instead provided in a fixed position.

The striker mechanism 26 further includes a projecting portion 32. The projecting portion 32 is secured to the striker plate 30. In one example, the projecting portion 32 is integrally formed with the striker plate 30, such as by welding, bonding, or the like. In other examples, however, the projecting portion 32 can be attached to the striker plate 30 with any number of fasteners, such as mechanical fasteners, adhesives, etc. The projecting portion 32 defines a C-shaped member extending outwardly in a direction that is generally perpendicular to the striker plate 30. In further examples, the projecting portion 32 is not limited to the C-shaped member as shown, and could include any number of shapes, such as a square-shaped member with rounded or square edges, an oval shaped member, etc. Similarly, the projecting portion 32 could be larger or smaller than as shown, as the projecting portion 32 could extend a longer or shorter distance from the striker plate 30, could be narrower in width, etc.

The striker mechanism 26 further includes one or more striker attachment openings 34. The striker attachment openings 34 are positioned on opposing sides of the projecting portion 32. In further examples, however, the striker attachment openings 34 can be positioned at a variety of locations within the striker plate 30, such as closer to a center of the striker plate 30 (i.e., nearer in proximity to the projecting portion 32) or further from the center of the striker plate 30 (i.e., closer to edges of the striker plate 30). The striker attachment openings 34 extend through the striker plate 30 from a first side to an opposing second side. In the shown example, the striker attachment openings 34 are smaller in size (e.g., diameter) than the door frame attachment openings 23 in the door frame 20.

The striker attachment openings 34 are sized to receive one or more attachment structures 38. The attachment structures 38 are shown to be detached from the striker mechanism 26 in FIG. 3. However, in a fully assembled state, the attachment structures 38 will pass through the striker attachment openings 34. In particular, each striker attachment opening is sized and shaped to receive one of the attachment structures 38. The attachment structures 38 function to attach the striker mechanism 26 to the door frame 20. The attachment structures 38 can include any number of fastening devices, such as screws, nuts, bolts, etc. As such, the attachment structures 38 shown in FIG. 3 are somewhat generically depicted, as it is to be appreciated that a number of different types of attachment structures 38 are envisioned.

Figure 4:
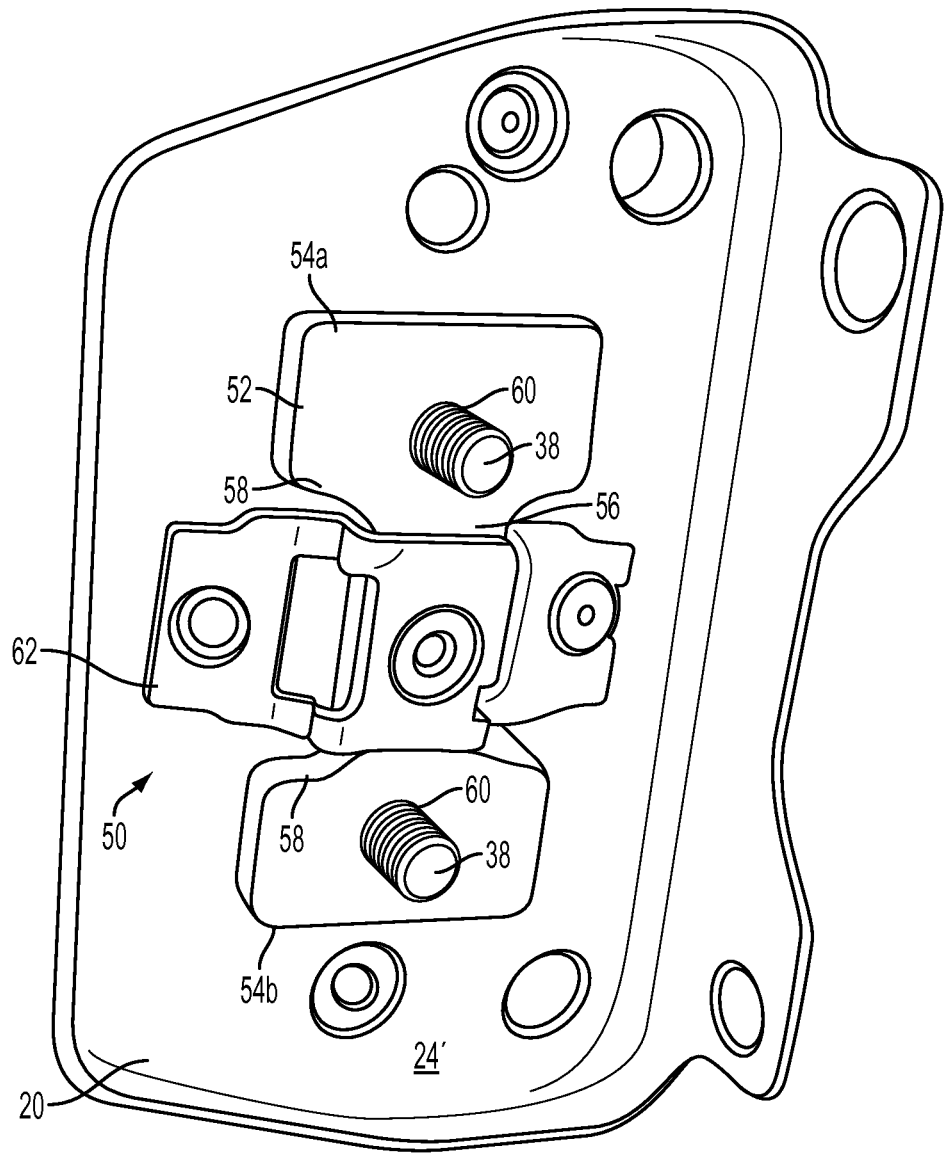
FIG. 4 is a perspective view of a rear side of the door frame shown in FIG. 3 including a striker positioning assembly.

Turning now to FIG. 4, a striker attachment assembly 50 will now be described in more detail. FIG. 4 depicts a rear side of the door frame 20 with a door frame surface 24' on an opposite side than as shown in FIG. 3. To allow for relative movement of the striker mechanism 26 with respect to the door frame 20, the striker mechanism 26 can be attached to the striker attachment assembly 50. As such, the striker mechanism 26 can be positioned on a first side of the door frame 20 on the door frame surface 24 while the striker attachment assembly 50 is positioned on an opposing second side of the door frame 20 on the door frame surface 24'.

The striker attachment assembly 50 includes an attachment plate 52. The striker attachment assembly 50 defines a generally planar surface that extends parallel to the door frame surface 24'. As such, the striker attachment assembly 50 is flush with the door frame surface 24' when the striker attachment assembly 50 is attached to the striker mechanism 26. The attachment plate 52 is a generally elongate structure defined by opposing end portions 54a, 54b and a central portion 56. The end portions 54a, 54b can be identical in size and shape or have different shapes. The end portions 54a, 54b are attached to each other by the central portion 56. In one example, the end portions 54a, 54b have a larger size (e.g., width) than the central portion 56 such that shoulder portions 58 are formed at the intersection of the end portions 54a, 54b and central portion 56. It is to be appreciated that the size and shape of the attachment plate 52 is not limited to the example shown in FIG. 4. Rather, the attachment plate 52 could be longer or shorter in length than as shown. Similarly, the attachment plate 52 is not limited to including the end portions 54a, 54b and central portion 56 as shown, and instead could include a generally rectangular shape, oval shape or the like.

The attachment plate 52 further includes one or more attachment openings 60. The attachment openings 60 are positioned in each of the end portions 54a, 54b. The attachment openings 60 can extend partially or completely through the attachment plate 52. In one example, each of the attachment openings 60 can be aligned with the door frame attachment openings 23 and the striker attachment openings 34. In particular, a distance separating each of the attachment openings 60 can be approximately the same as a distance separating the door frame attachment openings 23 and a distance separating the striker attachment openings 34. The attachment openings 60 can be sized and shaped to receive and mate with the attachment structures 38. In one example, the attachment structures 38 each include a threaded portion. The attachment openings 60 and/or the striker attachment openings 34 can each include a corresponding female thread for receiving and mating with the threaded portion of the attachment structures 38. As such, the attachment openings 60 can function to attach the striker attachment assembly 50 to the striker mechanism 26 by means of the attachment structures 38.

The attachment openings 60 can have a size (e.g., diameter) that is smaller than a size of the door frame attachment opening 23. Accordingly, when the attachment openings 60 receive and mate with the attachment structures 38, the attachment structures 38 can allow for movement within the relatively larger door frame attachment opening 23. This movement allows for the striker attachment assembly 50 and striker mechanism 26 to move with respect to the door frame 20.

The striker attachment assembly 50 further includes a holder 62. The holder 62 can attach the attachment plate 52 to the door frame surface 24'. In one example, the holder 62 allows for movement of the attachment plate 52 with respect to the door frame surface 24'. The holder 62 defines an elongated plate-like structure with opposing ends being attached to the door frame surface 24'. A central portion of the holder 62 can support the central portion 56 of the attachment plate 52 and hold the attachment plate 52 with respect to the door frame surface 24'. The holder 62 can further engage the shoulder portions 58 of the end portions 54a, 54b and limit axial movement of the attachment plate 52 with respect to the holder 62. It is to be appreciated that the holder 62 is not limited to the plate-like structure shown in FIG. 4, and that the attachment plate 52 could be attached in any number of ways. The holder 62 can include, for example, adhesives, elastomer-like materials, mechanical fasteners, snap fit means, etc. In a further example, the striker attachment assembly 50 may be provided without the holder 62, such that the attachment plate 52 could be attached directly to the striker mechanism 26 without the use of the holder 62. Accordingly, the holder 62 shown in FIG. 4 comprises only one possible structure, as a number of examples are envisioned.

It is to be appreciated that the striker attachment assembly 50 comprises only one way of attaching the striker mechanism 26 to the door frame 20. Indeed, in further examples, the striker mechanism 26 could be attached directly to the door frame 20 without the need for the striker attachment assembly 50. In such an example, the striker mechanism 26 could be attached by any number of attachment means, such as mechanical fasteners, magnets, etc.

Referring now to FIGS. 2 to 4, the operation of the striker mechanism 26 and striker attachment assembly 50 will now be briefly described. During installation of the door 12, the striker mechanism 26 can be adjusted and repositioned so as to fit within the door slot 14 of the door 12. Initially, the striker mechanism 26 can be attached to the striker attachment assembly 50 so as to allow the striker mechanism 26 to be moved and adjusted with respect to the door frame surface 24 in a manner in which the striker mechanism 26 maintains its position when it is not being adjusted. In particular, the attachment structures 38 are inserted through the striker attachment openings 34, through the door frame attachment opening 23, and through the attachment openings 60. However, the attachment structures 38 are rather loosely tightened to the attachment plate 52, such that the striker mechanism 26 can be moved with respect to the door frame surface 24' when desired in the manner described in more detail hereinbelow. After the striker mechanism 26 has been moved to a desired position, the attachment structures 38 can be further tightened. By further tightening the attachment structures 38, the door frame surfaces 24, 24' are sandwiched and held between the striker plate 30 and attachment plate 52 to hold the striker mechanism 26 fixedly in place.

Figure 5A:
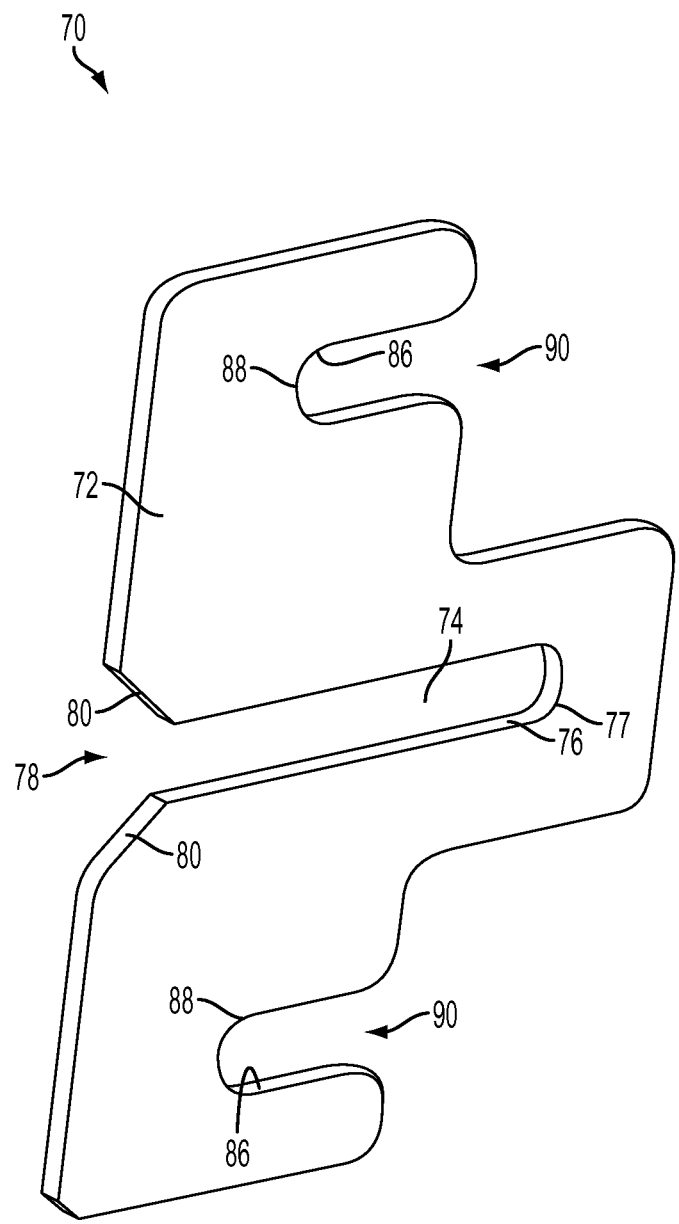
FIG. 5A is a perspective view of the example striker positioning assembly.
Figure 5C:
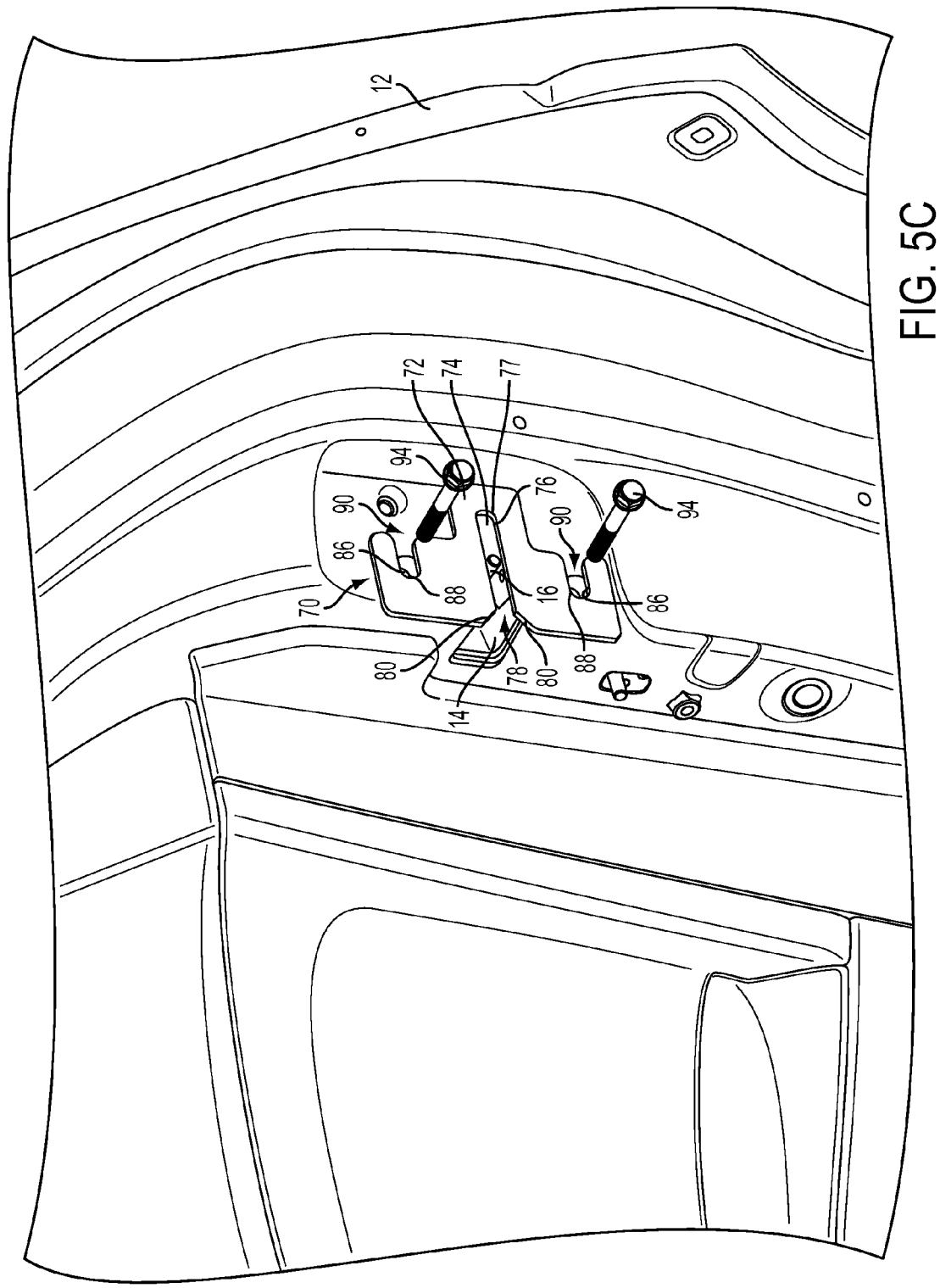
FIG. 5C is a perspective view similar to FIG. 5B with the example striker positioning assembly attached to the door.

Turning now to FIGS. 5A to 5C, the striker positioning assembly 70 will now be described in more detail. The striker positioning assembly 70 can be attached to the door 12 of the vehicle 10. In particular, one example of the door 12 is shown including the door slot 14. The door slot 14 defines an opening that is sized and shaped to receive the projecting portion 32 of the striker mechanism 26. The door slot 14 further includes the latch 16 positioned within the door slot 14. The latch 16 can selectively grip the projecting portion 32 when the projecting portion 32 is positioned within the door slot 14.

Referring now to FIGS. 5A and 5C, the striker positioning assembly 70 can be removably and temporarily attached to the door 12 and positioned adjacent the door slot 14. During installation of the door 12 onto the door frame 20, the striker positioning assembly 70 is attached to the door 12. The door 12 can be closed with the striker positioning assembly 70 engaging the striker mechanism 26. The striker positioning assembly 70 can move and reposition the striker mechanism 26 such that the striker mechanism 26 fits within the door slot 14. The striker positioning assembly 70 can then be removed from the door 12.

The striker positioning assembly 70 includes a plate 72. The plate 72 defines a generally planar surface that is positioned to extend parallel to a side surface of the door 12. The plate 72 is therefore flush with a surface of the door 12. The plate 72 is a generally elongate structure with one or more openings, slots, etc. positioned therein. As will be described in more detail below, the plate 72 can receive one or more fasteners 94 for temporarily attaching the plate 72 to the door 12 during the assembly process. The plate 72 can be formed of a number of different materials, including metal, plastic, or the like.

The plate 72 includes a slot 74. The slot 74 can be positioned at a central portion of the plate 72 and extends at least partially into an interior area of the plate 72. The slot 74 is bound by one or more slot walls 76 and, in one example, can be bound on three sides. A back slot wall 77 is provided as one of these walls. In the shown example, the slot 74 is bound by upper and lower slot walls, with a rear slot wall extending between the upper and lower slot walls. The slot 74 can therefore define a slot opening 78 positioned opposite from the rear slot wall. The slot can further include contoured edges 80 positioned adjacent the slot opening 78. The contoured edges 80 define a rounded, curved, beveled, etc. edge of the slot opening 78. The contoured edges 80 can guide the striker mechanism 26 through the slot opening 78 and into the slot 74.

The plate 72 is positioned such that the slot 74 is aligned with, and superimposed on, the door slot 14 (although the slots will not typically fully align with each other, as some differences in size are typically provided to support the methods disclosed herein). In particular, the slot 74 extends adjacent the door slot 14. The slot 74 can have dimensions that substantially match the size and shape of the door slot 14. For example, the slot 74 has a width (i.e., distance between the upper and lower walls) that is substantially equal to a width of the door slot 14. Similarly, the slot 74 has a length (i.e., length of the upper/lower walls or distance from the slot opening 78 to the rear wall) that is substantially equal to a length of the door slot 14. These dimensions can be slightly larger in size than dimensions of the projecting portion 32 of the striker mechanism 26. As such, the slot 74 and door slot 14 can simultaneously receive the projecting portion 32 of the striker mechanism 26 when the door 12 is moved into the closed position.

The plate 72 further includes one or more plate attachment openings 86 for receiving the fasteners 94. While the shown example of FIGS. 5A and 5C includes two plate attachment openings, it is to be appreciated that any number of plate attachment openings are envisioned. The plate attachment openings 86 can be positioned at opposing longitudinal ends of the plate 72. The plate attachment openings 86 can each be bounded by one or more attachment walls 88. In the shown example, the attachment walls 88 include upper and lower attachment walls, with a front attachment wall extending between the upper and lower attachment walls. The plate attachment openings 86 define a gap 90 positioned on a fourth side that is opposite from the front wall (i.e., at a rear side).

The plate attachment openings 86 can each be sized and shaped to receive the fasteners 94. Each fastener 94 can extend through the plate attachment openings 86 and into the door 12, thereby attaching the plate 72 to the door 12. In one example, the fasteners 94 can also secure the latch 16 to the door 12, such that the fasteners 94 simultaneously engage the striker positioning assembly 70 and the latch 16. By providing the gap 90 on one side of the plate attachment opening 86, the plate 72 can be detached from the door without having to remove the fasteners 94. In particular, the gaps 90 shown in FIGS. 5A and 5C are positioned at a rear side of the plate attachment openings 86. To remove the plate 72 from the door 12, the plate 72 can be slid forward in a direction away from the fasteners 94. In further examples, the plate attachment openings 86 are not limited to having the gap 90. Rather, the plate attachment openings 86 could be bound on four sides by the attachment walls 88, such that the fasteners 94 are removed from the door 12 prior to detaching the striker positioning assembly 70. Further still, the gap 90 is not limited to being positioned at a rear side of the plate attachment opening 86, and instead could be positioned at a front side, upper side, lower side, etc.

The fasteners 94 can be used to attach the plate 72 to the door 12. The fasteners 94 are somewhat generically/schematically depicted, as it is to be appreciated that the fasteners 94 can include a variety of different structures. For example, the fasteners 94 can include any number of mechanical fasteners, such as screws, nuts, bolts, etc. Further, the fasteners 94 could also include magnets, adhesives, snap fit means, or the like. As such, the fasteners 94 shown in FIG. 5C comprise only one possible example of fasteners for attaching the striker positioning assembly 70 to the door 12.

The method of adjusting the striker mechanism 26 on the door frame 20 with the striker positioning assembly 70 will now be described in detail. Initially, the striker mechanism 26 is attached to the door frame 20 such as in the manner discussed in detail above. For example, the attachment structures 38 are passed through the striker attachment openings 34, the door frame attachment openings 23, and through the attachment openings 60 of the striker attachment assembly 50. The attachment structures 38 are not completely tightened, such that the striker mechanism 26 is movable relative to the door frame 20 when some sufficient force is applied, but they are sufficiently tightened so that the striker mechanism 26 maintains its position when it is not being adjusted and thus no force or a lesser force is being applied.

The striker positioning assembly 70 will be attached to the door 12 in a removable manner. For example, the plate 72 of the striker positioning assembly 70 can be positioned against the door such that the slot 74 is adjacent the door slot 14. Once in place, the fasteners 94 are used to removably attach the striker positioning assembly 70 to the door 12. In particular, the fasteners 94 are inserted through the plate attachment opening 86 of the plate 72 and into corresponding openings in the door 12. The slot 74 is positioned in a location that will help position the striker mechanism 26 in the desired location when the door is placed in the desired closed position through the action of the back slot wall 77 interacting with the projecting portion 32 of the striker mechanism 26 to push the striker mechanism toward the body of the vehicle 10, while the slot said walls 76 will properly adjust the rotational angle position of the striker mechanism 26. If the door has been positioned too far into the body such that the striker mechanism 26 has been adjusted too far toward the body, pulling the door outward into the desired location will properly adjust the striker mechanism 26 through contact between the striker mechanism 26 and the latch 16. During the process of adjusting the position of the striker mechanism 26, the fasteners 94 will temporarily fasten the plate 72 to the door 12. However, once the striker mechanism 26 has been adjusted to the desired position, the plate 72 can be removed from the door 12 by sliding the plate 72 in a forward direction away from the fasteners 94.

After the striker mechanism 26 has been attached to the door frame 20 and the striker positioning assembly 70 has been attached to the door 12, the door 12 can be closed onto the door frame 20. The door 12 is shown to be closing onto the door frame 20 in FIG. 1. The door 12 can be placed in a desired position with respect to the door frame 20 such as, for example, by positioning the door 12 to be flush with surrounding portions of the vehicle 10.

Figure 6:
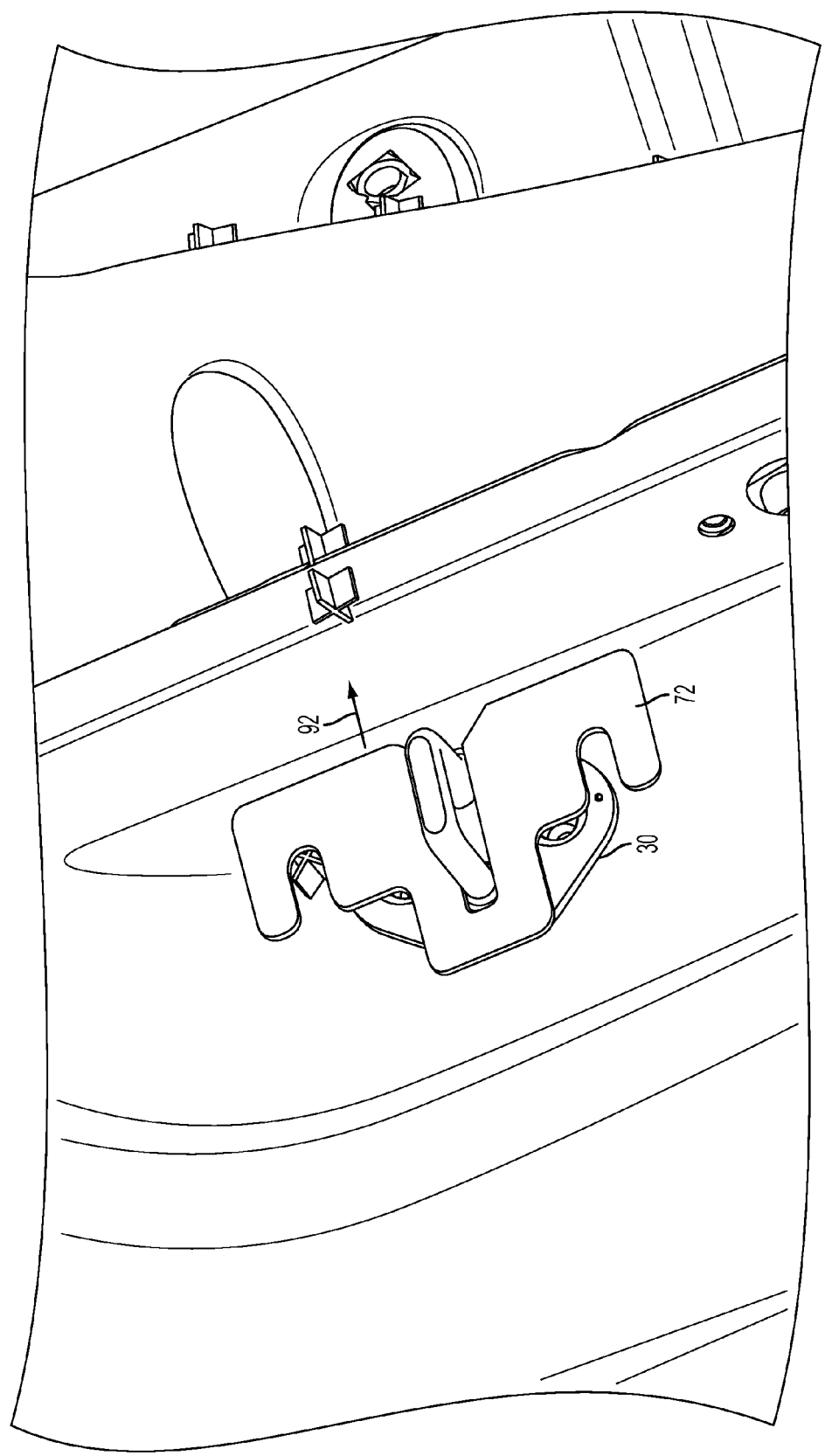
FIG. 6 is a perspective view of the example striker positioning assembly engaging the striker mechanism.

Referring now to FIG. 6, the striker positioning assembly 70 is shown engaging the striker mechanism 26. It is to be appreciated that the striker positioning assembly 70 is shown in a detached state from the door 12 for illustrative purposes. In particular, the striker positioning assembly 70 is normally not visible from such a view due to the door 12 obstructing the striker positioning assembly 70 and striker mechanism 26. However, to more clearly illustrate how the striker positioning assembly 70 engages and receives the striker mechanism 26, FIG. 6 shows the striker positioning assembly 70 without the door 12. Of course, during operation, the striker positioning assembly 70 will be in a fully assembled state (i.e., attached to the door 12) in a manner similar to the example shown in FIG. 5C.

During the closing of the door 12 onto the door frame 20, the striker positioning assembly 70 can move in a first direction 92 towards the striker mechanism 26. The striker positioning assembly 70 can interact and engage the striker mechanism 26 (shown in FIG. 6) to position the striker mechanism 26 on the door frame 20 in the desired location. Since the striker mechanism 26 is movable with respect to the door frame 20, the striker mechanism 26 can be moved (e.g., translated, rotated, etc.) as the projecting portion 32 is further received within the slot 74 of the striker positioning assembly 70. For example, the striker mechanism 26 may be too high or too low or at an improper rotational angle on the door frame 20 with respect to the striker positioning assembly 70. In such a situation, as the door 12 is closed, the contoured edges 80 will work to contact and engage the projecting portion 32 while the slot walls 76, 77 will adjust the position the striker mechanism 26. The projecting portion 32 will pass through the slot opening 78 and, as the door 12 is fully closed, the projecting portion 32 can be fully received within the slot 74. In this closed position, the projecting portion 32 is received within both the slot 74 and the door slot 14 such that the latch 16 of the door slot 14 can latch onto the projecting portion 32.

Once the striker mechanism 26 has been adjusted to the desired position, the striker mechanism 26 can be secured to the door frame 20. To secure the striker mechanism 26 to the door frame 20, the attachment structures 38 can be tightened, or alternatively the striker mechanism 26 could be welded or glued in place. This tightening of the attachment structures 38 could be done from the front (i.e., from the side of the striker mechanism 26) or from the rear (i.e., from the side of the striker attachment assembly 50). This tightening of the attachment structures 38 can occur either while the door 12 is engaged with the striker mechanism 26 or after the door 12 has released the striker mechanism 26. For example, while the door 12 is engaged with the striker mechanism 26, the attachment structures 38 could be tightened from the front or back. In the alternative, after the door 12 has released the striker mechanism 26, the attachment structures 38 could then be tightened. The attachment structures 38 can tighten the striker plate 30 to the attachment plate 52. This tightening will cause the striker plate 30 and attachment plate 52 to sandwich and grip the door frame surfaces 24, 24', thus limiting movement of the striker mechanism 26 with respect to the door frame 20.

Once the striker mechanism 26 has been adjusted, the striker positioning assembly 70 can also be removed from the door 12. To remove the striker positioning assembly 70, the plate 72 can be slide forward in a direction away from the gap 90. By sliding the plate 72 in such a manner, the striker positioning assembly 70 is removed from the fasteners 94. At this point, the fasteners 94 can be tightened into the door 12 so as not to obstruct the door 12 when the door 12 is opened and closed. The door can then be put into use through opening and closing.

Figure 7:
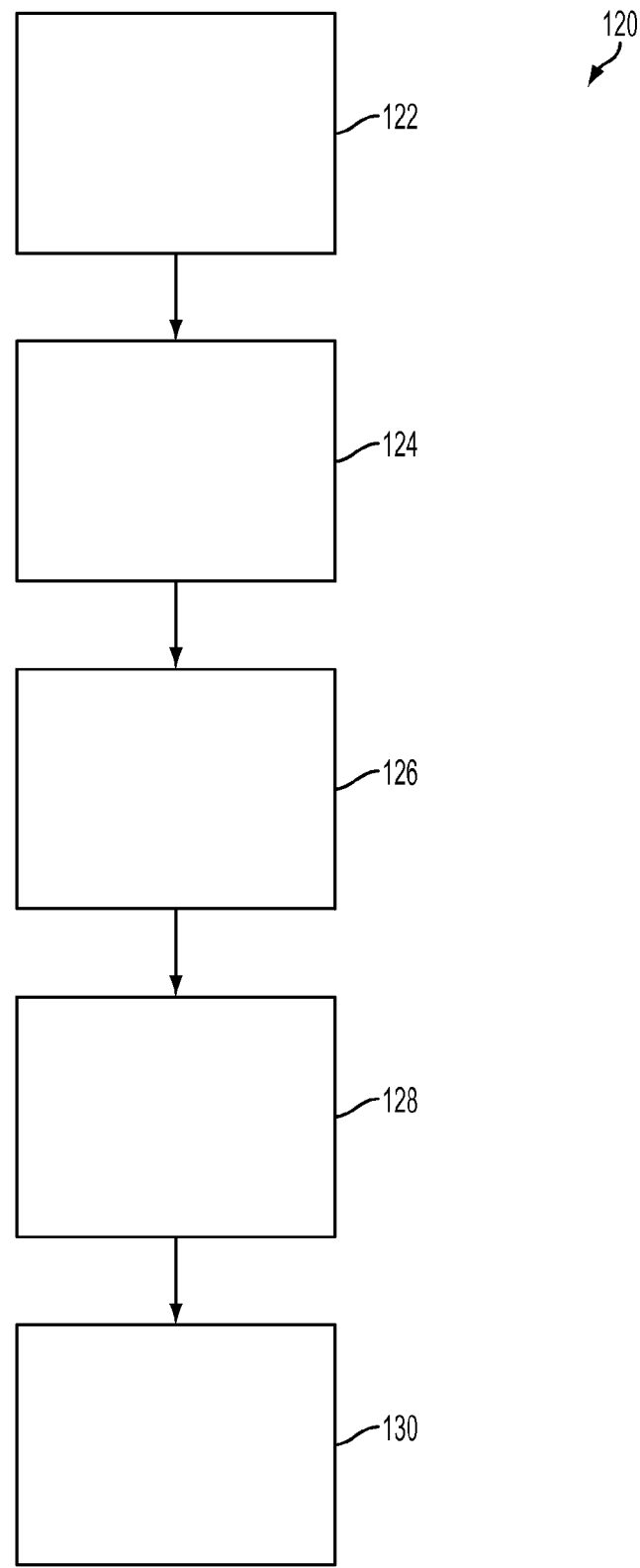
FIG. 7 is a flow chart depicting a method of adjusting the striker mechanism on the door frame.

Referring now to FIG. 7, the method of adjusting the striker mechanism 26 on the door frame 20 can further be explained with the use of a flow chart. Initially, in step 122, the striker mechanism 26 can be attached to the door frame 20 such that the striker mechanism 26 is movable relative to the door frame 20. Next, in step 124, the striker positioning assembly 70 is attached to the door 12 in a removable manner. Next, in step 126, the door 12 is closed onto the door frame 20 and placed in a desired position with respect to the door frame 20. In this step, the striker positioning assembly 70 can interact with the striker mechanism 26 to position the striker mechanism 26 on the door frame 20 in a desired location. In step 128, after the striker mechanism 26 has been plated in the desired location, the striker mechanism 26 can be secured to the door frame 20 in a fixed manner (e.g., by tightening the attachment structures 38). Finally, in step 130, the striker positioning assembly 70 can be removed from the door 12 prior to putting the door 12 into use.

The disclosure has been described with reference to the example embodiments described above. Modifications and alterations will occur to others upon a reading and understanding of this specification. Example embodiments incorporating one or more aspects are intended to include all such modifications and alterations insofar as they come within the scope of the appended claims.

What is claimed is:

1. A method of adjusting a striker mechanism on a door frame for latching a door, said method comprising the steps of:
   attaching the striker mechanism to the door frame such that the striker mechanism is movable relative to the door frame;
   attaching a striker positioning assembly to the door in a removable manner;
   closing the door onto the door frame such that the door is placed in a closed position with respect to the door frame, wherein said striker positioning assembly interacts with the striker mechanism to position the striker mechanism on the door frame in a proper location for placing the door in a desired position;
   securing the striker mechanism to the door frame in a fixed manner; and
   removing said striker positioning assembly from the door.

2. The method of claim 1, wherein the step of attaching said striker positioning assembly includes the step of aligning a slot of the striker positioning assembly with a door slot of the door such that the slot of the striker positioning assembly is superimposed on the door slot.

3. The method of claim 2, wherein during said step of closing the door onto said door frame, a projecting portion of said striker mechanism interacts with said striker positioning assembly such that the projecting portion is received within the slot of the striker positioning assembly and within the door slot of the door.

4. The method of claim 3, wherein when the projecting portion of the striker mechanism interacts with said striker positioning assembly, the striker mechanism is moved relative to the door frame.

5. The method of claim 1, wherein the striker positioning assembly is removably attached to the door by at least one fastener.

6. The method of claim 5, wherein the at least one fastener passes through a plate attachment opening in the striker positioning assembly and into the door.

7. The method of claim 1, wherein the striker positioning assembly is comprised of a flat component having a plurality of slots.

8. The method of claim 1, wherein the door latching mechanism engages the striker mechanism during the closing step and prior to the securing step.

9. A method of adjusting a striker mechanism on a door frame for latching a door, said method comprising the steps of:
- attaching a striker mechanism to the door frame such that the striker mechanism is movable relative to the door frame;
- attaching a striker positioning assembly to the door in a removable manner such that a slot of said striker positioning assembly is aligned with a door slot containing a latch;
- closing the door onto the door frame such that the door is placed in a desired position with respect to the door frame such that a portion of the striker mechanism is simultaneously received by the slot of said striker positioning assembly and the door slot; and
- securing the striker mechanism to the door frame in a fixed manner; and
- removing said striker positioning assembly from the door.

10. The method of claim 9, wherein when the striker mechanism is received within the slot of said striker positioning assembly and the door slot, the striker mechanism is moved relative to said door frame.

11. The method of claim 9, wherein the striker positioning assembly is attached to the door by at least one fastener.

12. The method of claim 11, wherein the at least one fastener passes through a plate attachment opening in the striker positioning assembly and into the door.

13. The method of claim 9, wherein the striker positioning assembly is comprised of a flat component having a plurality of slots.

14. A method of adjusting a striker mechanism on a door frame for latching a door, said method comprising the steps of:
- attaching the striker mechanism to the door frame;
- attaching a striker positioning assembly to the door in a removable manner;
- closing the door onto the door frame such that the door is placed in a closed position with respect to the door frame, wherein the striker positioning assembly positions the striker mechanism on the door frame;
- securing the striker mechanism to the door frame in a fixed manner; and
- removing said striker positioning assembly from the door.

15. The method of claim 14, wherein, during the step of closing the door, the striker position assembly interacts with the striker mechanism to position the striker mechanism on the door frame in a proper location for placing the door in a desired position.

16. The method of claim 14, wherein the step of attaching said striker positioning assembly includes the step of aligning a slot of the striker positioning assembly with a door slot of the door such that the slot of the striker positioning assembly is superimposed on the door slot.

17. The method of claim 14, wherein during said step of closing the door onto said door frame, a projecting portion of said striker mechanism interacts with said striker positioning assembly such that the projecting portion is received within the slot of the striker positioning assembly and within the door slot of the door.

18. The method of claim 17, wherein when the projecting portion of the striker mechanism interacts with said striker positioning assembly, the striker mechanism is moved relative to the door frame.

19. The method of claim 14, wherein the striker positioning assembly is removably attached to the door by at least one fastener.

20. The method of claim 19, wherein the at least one fastener passes through a plate attachment opening in the striker positioning assembly and into the door.

21. The method of claim 14, wherein the striker positioning assembly is comprised of a flat component having a plurality of slots.

22. The method of claim 14, wherein the door latching mechanism engages the striker mechanism during the closing step and prior to the securing step.

* * * * *